United States Patent [19]

Rosbak et al.

[11] 4,149,426
[45] Apr. 17, 1979

[54] CLUTCH MECHANISM

[75] Inventors: John Rosbak, Fonthill; Ken K. Oka, St. Catharines, both of Canada

[73] Assignee: Deere & Company, Moline, Ill.

[21] Appl. No.: 873,038

[22] Filed: Jan. 27, 1978

[51] Int. Cl.² ............... F16H 7/10; F16H 55/52
[52] U.S. Cl. ............... 74/242.12; 74/230.17 C; 74/242.13 R; 74/242.15 R
[58] Field of Search ............ 74/242.12, 242.13 R, 74/242.15 R, 230.17 C

[56] References Cited

U.S. PATENT DOCUMENTS

| | | | |
|---|---|---|---|
| 3,015,965 | 1/1962 | Williams et al. | 74/242.12 |
| 3,943,785 | 3/1976 | Percifield | 74/242.13 |

*Primary Examiner*—Leonard H. Gerin

[57] ABSTRACT

A device for engaging and disengaging a power shaft and driven elements of a forage wagon or similar tractor drawn implement. A split sheave clutch having a driving face connected to the power shaft and a driven face connected to the driven elements is engaged by tightening a V-belt between the faces. The belt tightening mechanism includes an idler pulley shiftable to and from a belt tightening position and a latching mechanism releasably securing the pulley in the belt tightening position. A latch control member connected to a safety bar extending across the front of the wagon releases the latching mechanism to disengage all the driven elements when the operator either pushes or pulls the safety bar. The driven elements can be re-engaged with the power shaft by shifting the pulley to the belt tightening position without need for the operator to first return to the tractor to stop the power shaft.

14 Claims, 7 Drawing Figures

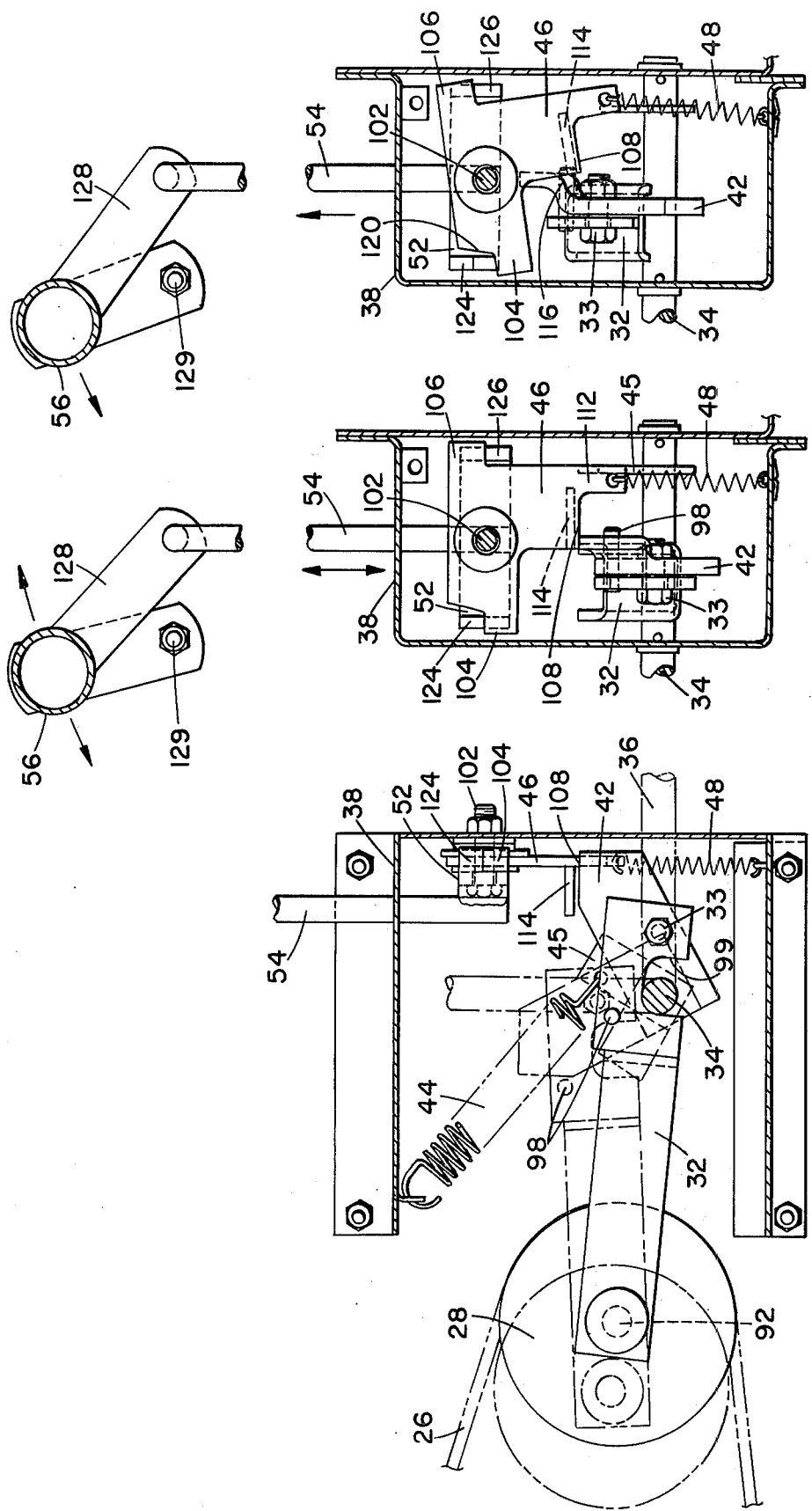

CLUTCH MECHANISM

BACKGROUND OF THE INVENTION

The present invention relates generally to the drive system for a material handling implement. More specifically it relates to a mechanism for engaging and disengaging a drive shaft and driven elements on a forage wagon or similar tractor drawn implement operable by the tractor power take-off.

On the conventional type of material unloader used for transporting forage, hay and the like, there is generally provided an apron chain, beaters and a cross conveyor operated by a power shaft having a clutching mechanism. For reasons of safety and convenience a safety trip mechanism is located near the front of the implement to trip the clutch and disengage the power shaft from the various drives. In the case of previous forage wagons, tripping or disengaging the clutch left part of the drive system and at least one of the mechanisms such as the cross conveyor in operation. If a large clump of material fell in the cross conveyor, the operator often could not shut down the drive in sufficient time to prevent jamming.

Previous systems employed a jaw clutch which could not be engaged while the power shaft rotated. This type of system was expensive to manufacture, and occupied a considerable amount of space. Further, after tripping that type clutch, the operator had to go to the tractor to stop the power shaft and then return to the implement to re-engage the mechanism. This jaw clutch additionally projected outwardly, increasing space requirements and posing a hazard when shielding was removed.

On conventional wagons, a trip lever or bar is provided as the control to release the clutch and disengage the drive shaft from the various driven mechanisms. Tripping the clutch required movement of the bar or lever in a specific direction, usually toward the operator. In certain situations where immediate shut-down was desired, the operator could not conveniently move the bar or lever in the proper direction to operate the mechanism and disengage the driven elements.

SUMMARY OF THE INVENTION

The principal object of the present invention is to provide a clutch engaging and disengaging mechanism which quietly, easily and conveniently engages or disengages a power shaft from all the various power driven elements on an implement.

A further object of the present invention is to provide a clutch mechanism which can be easily disengaged and also reengaged while the power shaft is rotating so that the operator can perform both functions without returning to the tractor to stop the power take-off.

Another object of the present invention is to provide a clutch mechanism that requires fewer parts, occupies less space, and is less expensive to manufacture than previously available mechanisms.

An additional object of the present invention is to provide a clutch assembly with a trip release that is movable in at least two different directions for disengaging a power shaft from the power driven mechanisms.

A further object of the present invention is to provide a self-centering safety bar which the operator can either push or pull to disengage the clutch.

Still another object of the present invention is to provide a system which includes a split sheave clutch with a belt tightener arrangement for soft-engaging and disengaging a power shaft and power driven equipment on an implement.

BRIEF DESCRIPTION OF THE DRAWINGS

In the drawings:

FIG. 3 is an enlarged front view of the engaging and disengaging mechanism;

FIG. 4 is a side view of the trip release mechanism in the engaging position and including a fragmentary side view of the trip bar and connecting rod;

FIG. 5 is a side view similar to that of FIG. 4 but showing the trip bar pushed to the left and the mechanism in the non-engaging position;

DESCRIPTION OF THE PREFERRED EMBODIMENT

Figure 1:
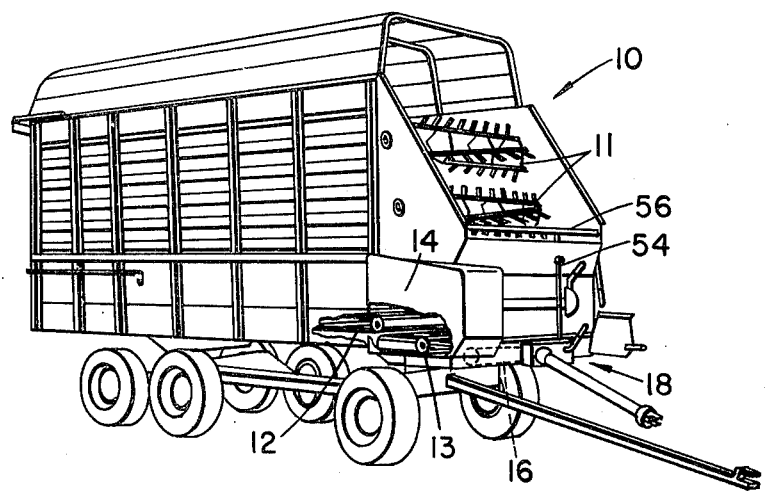
FIG. 1 is a perspective view of a forage wagon embodying a clutch mechanism according to the present invention.

Referring to FIG. 1, a forage wagon embodying the present invention is indicated generally by the numeral 10. The wagon is of conventional construction and includes beaters 11, chain apron 12 and cross conveyor 13 operated by a series of drive mechanisms in gear box 14. The power for the beaters 11 and conveyors 12 and 13 is supplied through chain 16 connected between a clutch assembly 18 and gear box 14.

Figure 2:
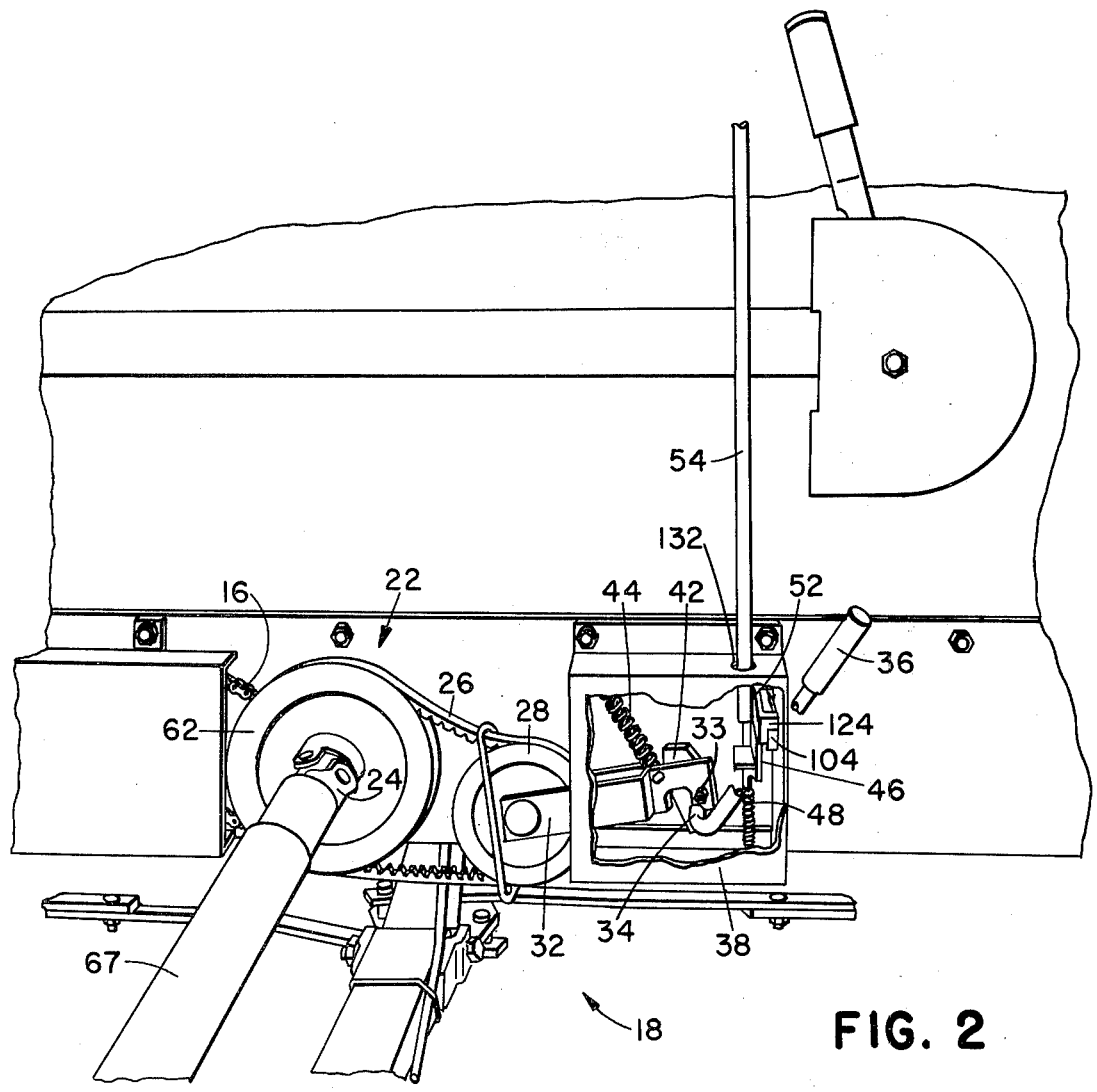
FIG. 2 is an enlarged front elevation view of a portion of the forage wagon illustrated in FIG. 1.

Clutch assembly 18, as viewed in FIG. 2, includes a split sheave pulley shown generally at 22 connected to a power shaft 24 which is coupled with the power take-off of a tractor. A V-belt 26 extends between the split sheave pulley and an idler pulley 28 mounted on link 32. A shaft 34 with handle 36 extending therefrom is mounted on housing 38 and carries a lever 42 pivotably connected to link 32 by the cap screw 33. Lever 42 rocks about the axis of shaft 34 and spring 44 extends between the frame 38 and the plate 45 (FIG. 3) to bias the shaft 34 and lever 42 in a counterclockwise direction. As handle 36 is changed from an upright position to a horizontal position, the link 32 and its pulley 28 are shifted to the right to tighten the V-belt 26 and engage the tractor power take-off with the implement drives.

A latch 46 is mounted for rocking on housing 38 and is biased in a clockwise direction by spring 48. As lever 42 is rocked in a clockwise direction, as viewed in FIG. 3, by handle 36, the latch 46 will engage it and hold it in position. A latch control member 52 is positioned adjacent to and for contact with the latch 46. Control rod 54 extends through an opening 132 in the housing 38 and supports member 52. The rod 54 is connected to a safety bar 56 (see FIG. 1) which is mounted on the wagon 10 for movement in generally a forward or rearward direction. Movement of the bar 56 in either direction moves the latch control member 52 up or down rotating the latch 46 in a counterclockwise direction, as viewed in FIG. 4, to release lever 42 which can then rotate in a counterclockwise direction to return link 32 and pulley 28 to a non-belt tightening position.

Figure 6:
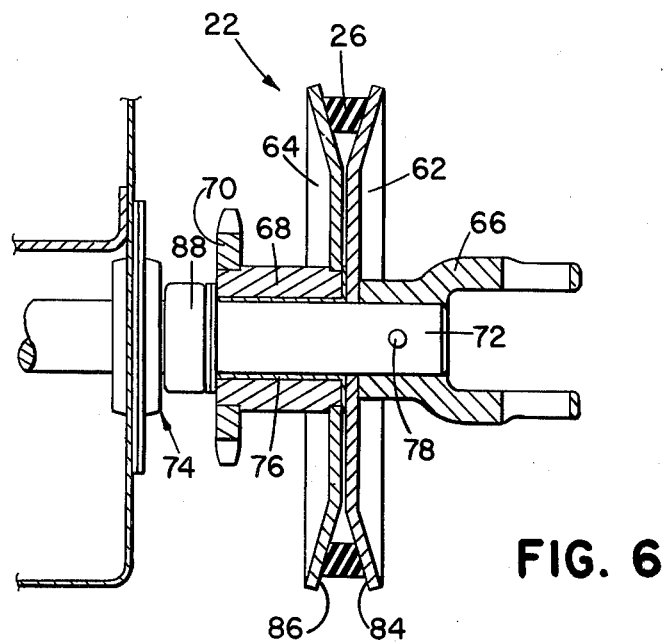
FIG. 6 is a cross sectional side view of the split sheave clutch.

Referring now to FIG. 6, the split sheave clutch includes a pair of complementary sides 62 and 64. Front side or driving face 62 is welded to yoke 66 which mates with a similar yoke on the power shaft 67. Rear side or driven face 64 is joined by a hub 68 to sprocket 70 which is coupled through chain 16 (see FIG. 2) to the apron chain, beater, and cross conveyor drives.

The complementary sides 62 and 64 are axially aligned on a support shaft 72 which extends through a main support assembly indicated at 74.

An oil impregnated insert 76 is located between shaft 72 and hub 68 and extends radially a short distance between sides 62 and 64 allowing the assembly, including sprocket 70, hub 68 and side 64 to rotate freely with respect to shaft 72 and side 62. A spring pin (not shown) inserted through hole 78 of shaft 72 and mating holes in yoke 66 locks front side 62 to the shaft. Sides 62 and 64 include complementary inclined surfaces 84 and 86, respectively, for receiving V-belt 26. The spring pin, and a locking collar 88 rigidly connected to shaft 72, prevent sides 62 and 64 from separating axially as V-belt 26 is pulled between the inclined surfaces 84, 86.

The clutch engaging and disengaging assembly, as better understood by referring to FIGS. 3–5, includes a belt tightener with idler pulley 28 mounted on the bifurcated end of link 32 by pin 92. A cap screw 33 connects link 32 with lever 42 which is welded on shaft 34. Also attached to shaft 34 is a return lever 45. Spring 44 connected between return lever 45 and the frame biases the entire shaft assembly including shaft 34, handle 36 and lever 42 in a counterclockwise direction. A stop pin 98 extends outwardly from link 32 into the plane of rotation of lever 42 to limit counterclockwise rotation of the shaft assembly. A notch 99 is provided in the singular end of link 32 to accommodate shaft 34 as the shaft assembly is rotated to its extreme clockwise position.

Latch 46 is pivotably mounted on the housing 38 by a pivot or bolt 102. The latch 46 is a flat plate and includes portions or projections 104 and 106 on its opposite sides. The lower portion of the latch 46 includes a surface 108 for engaging and holding lever 42 in the clockwise position, and a spring receiving extension 112. A guide member 114 projects outwardly at a right angle from the plane of latch 46. Lever 42 includes a reverse bend at 116 (see FIG. 5) which contacts member 114 as the shaft assembly is rotated in a clockwise direction. A spring 48 is connected between the extension 112 and the housing 38 for biasing the latch 46 in a clockwise direction about the pivot. The portion of latch 46 above the projection 104 is inclined at 120 to facilitate counterclockwise rotation (FIG. 5).

The trip plate 52 is supported from control rod 54 and is positioned adjacent and generally parallel to the upper portion of latch 46. Plate 52 is fixed at a right angle to the rod 54 to maintain a generally horizontal attitude. A pair of latch engaging ears 124 and 126 protrude at right angles from the ends of plate 52 in the direction of the latch 46 with ear 124 extending above projection 104 and ear 126 extending below projection 106. In an intermediate position shown in FIG. 4, the ears 124 and 126 contact or are in very close proximity to the corresponding projections 104 and 106 of latch 46, thus centering safety bar 56 with respect to the two directions of possible movement, indicated by the arrows. As discussed in detail later, any movement of safety bar 56 from the intermediate position rotates latch 46 counterclockwise against the bias of spring 48 which tends to return the bar to the intermediate position. Rod 54 in turn is supported on extension 128 connected to safety bar 56 which extends the width of the wagon (see FIG. 1). The bar 56 is pivotably mounted on the sides of the wagon, using bolts 129, for pushing or pulling either to the left or to the right from the intermediate position as shown in FIG. 4.

In operation, the power shaft 24 is driven by the tractor power take-off to rotate side 62 through yoke 66. Side 64 with sprocket 70 does not rotate so long as V-belt 26 remains untightened since sides 62 and 64 are mounted for rotation with respect to each other on shaft 72 as previously discussed. The V-belt 26 is tightened by moving of the idler pulley 28 to the right (FIG. 3) and is pulled between the inclined surfaces 84 and 86. The V-belt 26 acts as friction material for the clutch and transmits torque from side 62 to side 64 imparting rotation to side 64 and sprocket 70.

Moving the idler pulley 28 to the left loosens the V-belt 26 and allows it to move outwardly between inclined surfaces 84 and 86 thus removing the source of friction between sides 62 and 64. Torque is removed from side 64 and sprocket 70 shutting down all drives on the implement, including the main drive chain 16 (FIG. 2).

The split sheave 22 is a type of friction clutch and can be soft-engaged while the power shaft and side 62 are rotating. Therefore, the need to stop the power shaft before engaging the clutch on the implement is eliminated.

Referring now to FIGS. 2–5, the operation of the belt tightener and idler pulley 28 is as follows: With link 32 in its left-most position as indicated by the broken lines in FIG. 3, belt 26 is relaxed and the clutch is disengaged. Handle 36 is approximately at the 12 o'clock position, and lever 42 rests at an 11 o'clock position against stop pin 98. As the operator swings handle 36 downward toward the 3 o'clock position to engage the clutch, lever 42, rotating with shaft 34 toward a 2 o'clock latching position, pulls link 32 to the right and slightly downward as notch 99 extends around the shaft. Also, as the handle 36 is moved downward, lever 42 contacts the guide 114 causing latch 46 to rotate in a counterclockwise direction out of the way of the lever. As the lever 42 reaches the 3 o'clock clutch engaging position, spring 48 pulls the latch 46 back in the clockwise direction so that surface 108 is pulled over the lever locking it in position. The belt 26 thus is tightened and torque is transmitted from side 62 (FIG. 6) to side 64 of the split sheave providing drive through sprocket 70 and chain 16 to the apron chain, beaters and cross conveyor of the wagon.

If the operator wishes to stop all the driven elements on the wagon, safety bar 56 (FIGS. 4 and 5) is pushed or pulled respectively to the left or right. Assuming first the safety bar is moved to the left, as shown in FIG. 5, extension 128 pulls control rod 54 in a generally upward direction thus raising the trip plate 52 within housing 38. Latch engaging ear 126 contacts right projection 106 of latch 46 forcing the latch to pivot in a counterclockwise direction about pivot 102 and against the bias of spring 48. Surface 108 pivots away from lever 42 which then, along with shaft 34, handle 36 and return lever 45, is pulled in the counterclockwise direction by the spring 44, moving link 32 to the left to loosen belt 26 and disengage the clutch.

Alternatively, if the safety bar is moved to the right instead of the left, rod 54 and trip plate 52 move downwardly within the housing 38 and, instead of ear 126 engaging right projection 106 of the latch 46 as shown in FIG. 5, ear 124 as it moves downwardly contacts left projection 104 and forces latch 46 to pivot, again in the counterclockwise direction to release the lever 42 and disengage the clutch in the same manner as before.

It is to be noted that trip plate 52 prevents any further clockwise rotation of the latch 46 beyond the position shown in FIG. 4, since such rotation would tend to push ear 126 of the trip plate down and at the same time push ear 124 up. Trip plate 52, however, is rigidly mounted to the rod 54 so it cannot pivot, thus preventing the latch from rotating in a clockwise direction beyond the position shown.

Assuming the safety bar has just been operated and the latch 46 is in the position shown in FIG. 5, spring 48 biases the latch toward the position shown in FIG. 4. After the operator releases the safety bar, the spring 48 rotates latch 46 in the clockwise direction. Right projection 106 contacts ear 126 of trip plate 52, and pulls the plate downwardly to the position shown in FIG. 4, thus returning the safety bar 56 to its intermediate position.

If the safety bar is moved to the right, rod 54 and trip plate 52 will be in a lower position (not shown) with ear 124 contacting left projection 104. As the operator releases the safety bar, the spring 48 rotates latch 46 in the clockwise direction toward the position shown in FIG. 4, and projection 104 urges ear 124, and thus entire plate 52, upwardly returning the safety bar 56 to the intermediate position. The assembly therefore provides for simple and convenient self-centering of the safety bar.

Housing 38 includes a slot 132 (FIG. 2) for receiving the rod 54. The slot 132, along with the sides of the housing, help to guide the rod and the trip plate 52 to maintain proper registration with latch 46.

Figure 7:
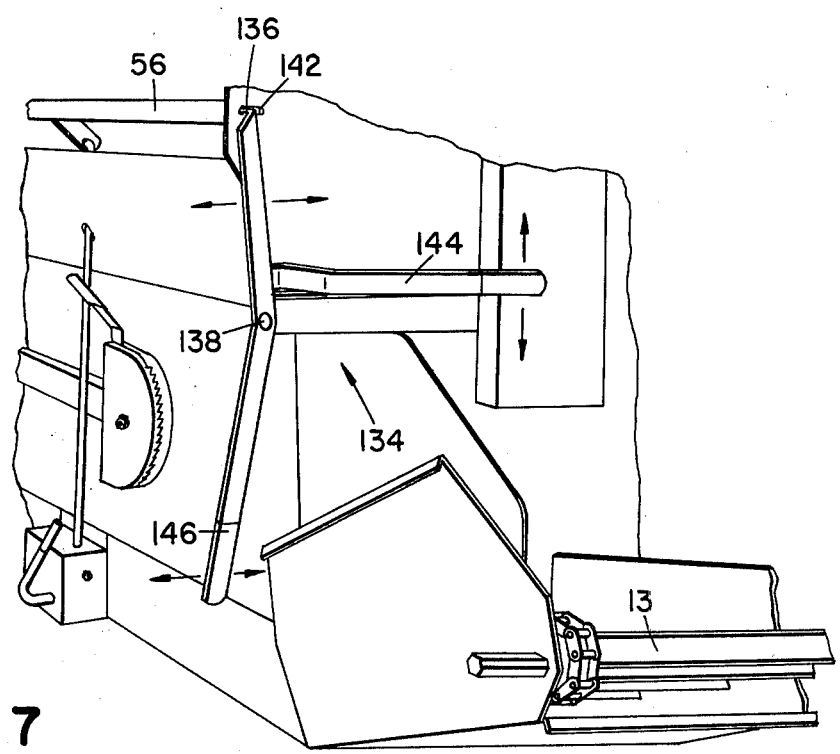
FIG. 7 is a perspective view of part of the left front of the wagon showing safety handles connected to the trip bar.

As seen in FIG. 7 a safety handle assembly 134 can be mounted on one side of the wagon, preferably near the output of the cross conveyor, and connected to the safety bar 56 at 136. The assembly 134 is mounted for rocking using bolt 138. A slot 142 in the side of the wagon allows the safety bar 56 to be moved in either direction by grasping one of handles 144 or 146 and moving it in the direction of either of the arrows.

We claim:

1. A mechanism for engaging and disengaging a power shaft and driven elements on an implement comprising:
   a split sheave including a driving face mounted on the shaft, and a complementary driven face mounted on the implement for rotation and connected to the driven elements;
   a shiftable link;
   an idler pulley connected to the link;
   a belt trained over the split sheave and the pulley;
   means for shifting the link and pulley to tighten the belt between the faces of the sheave and the pulley to engage the power shaft and the driven elements;
   latching means for releasably securing the link against movement when the belt is tightened;
   trip means mounted for movement on the implement in two directions for releasing of the latching means when the trip means is moved in either of the two directions; and
   means for urging the pulley away from its belt tightening position upon releasing of the link to thereby disengage the power shaft and the driven elements.

2. A device for selectively engaging and disengaging a frame supported V-belt transmission comprising:
   an arm connected to the transmission and shiftable to engage and disengage the same;
   a shaft mounted on the frame transverse to the arm;
   a lever member rockable with the shaft between a first and second position and connected to the arm;
   a latch member pivotably carried by the frame and biased toward a latching position engaged with the lever member when the lever member is in its second position;
   means biasing the lever member towards it first position;
   trip means movable in first or second directions from an intermediate position for contacting and pivoting the latch member to release the lever member from engagement with the latch member when the latter is in the second position as the trip means is moved in either direction.

3. The invention defined in claim 2 wherein there is further provided guide means on the latch member for slidably positioning the lever member into engagement with the latch member as the former is moved to its second position.

4. The invention defined in claim 2 wherein the trip means includes a control assembly mounted for rocking back and forth on the implement and a trip plate shiftable in the first and second directions adjacent the latch member for pivoting the latch member from engagement with the lever member as the assembly is rocked back or forth.

5. The device of claim 4 wherein a handle assembly is mounted for rocking on the frame and connected to the control assembly for moving the latter in either of the two directions.

6. A V-belt drive comprising:
   a frame;
   a drive shaft supported by the frame;
   a driven shaft supported by the frame;
   a split sheave composed of first and second opposed sheave portions, the first portion carried on the drive shaft for rotation therewith and the second portion carried on the driven shaft for rotation therewith;
   a idler pulley offset from the split sheave and aligned therewith;
   a V-belt trained around the pulley and between the first and second portions;
   a latch shaft generally parallel to the drive shaft and rockable between a first and second position;
   a lever means carried on the latch shaft and rockable therewith;
   a link member coupled with the pulley and lever for shifting the pulley to and from a belt tightening position as the latch shaft is rocked between its first and second position;
   a releasable latch member biased into engagement with the lever means as the latch shaft is rocked to its second position; and
   reciprocably shiftable trip means engageable with the lever means as said trip means is reciprocably shifted.

7. The invention defined in claim 6 further characterized by biasing means urging the pulley away from a belt tightening position.

8. The invention defined in claim 6 wherein there is further provided means for rocking the latch shaft between its two positions.

9. The invention defined in claim 6 wherein the latch member is pivotally supported by the frame for oscillating movement about an axis perpendicular to the latch shaft and spring means between the frame and said member urges the member towards a first position engageable with the lever means as the latch shaft is rocked to its second position.

10. For a belt drive including a main support, the improvement comprising:
- an idler pulley carried on the support to shift to and from a belt tightening position;
- a lever means mounted on the support to rock about a pivotal axis generally parallel to the axis of the pulley;
- a link member extending between the pulley and lever means and connected to the lever means in offset relation to its pivotal axis, the lever means being movable to move the link member and shift the pulley to its belt-tightening position;
- a latch member including first and second portions rockably mounted on the support and urged towards engagement with the lever means as the pulley is moved to its belt-tightening position;
- a control member carried on the support for generally linearly reciprocable movement towards and away from the lever means and having abutment means engageable with the latch member, the abutment means being engageable with the first portion of the latch member for releasing the latch member upon the control element moving in one linearly reciprocable direction and being engageable with the second portion of the latch member for releasing the latch member upon the control element moving in the opposite direction; and
- means connected to the lever means to move the latter out of latch member engaging position upon the latch member being released.

11. The invention defined in claim 10 wherein pivotal means supports the latch member and the first and second portions are on opposite sides of the pivotal means, the first portion including an upward facing surface and the second portion a downward facing surface, and wherein the abutment means comprises first and second ear members, the first ear member contacting the upward facing surface upon the control element moving in one direction and the second ear member contacting the downward facing surface upon the control element moving in the opposite direction to cause said latch to pivot in a single direction for releasing the latch member as the control member is moved in either direction.

12. The invention defined in claim 10 wherein the control element has an intermediate position corresponding to the lever means engaging position, the latch member biasing the control element toward the intermediate position when the latter is moved in either direction.

13. A safety release mechanism for engaging and disengaging a power shaft and driven elements on an implement comprising:
- a split sheave including a first face member connected to the power shaft for rotation therewith and a second face member mounted on the implement for rotation and connected to the driven elements;
- a shiftable link member;
- an idler pulley connected to the link;
- a V-belt trained over the split sheave and the pulley;
- a shaft connected to the implement and having an axis generally perpendicular to the link;
- lever means rockable between a first and second position about the shaft and connected to the link member to tighten the V-belt between the faces and impart rotation from the first face member to the second face member when the lever means is rocked to the second position;
- a pivot member mounted on the implement;
- a lever engaging latch member mounted for rocking about the pivot member and including a first and a second portion on opposite sides of the pivot;
- means for biasing the latch member toward engagement with the lever means to releasably secure the lever means in the second position;
- trip means comprising a linearly reciprocable trip plate including first and second ear members engageable with the first and second portions, rod means connected to the plate, safety bar means mounted on the implement for movement in first and second directions thereon and connected to the rod means to linearly reciprocate the trip plate to cause the first ear to engage the first portion and rock the latch member to release the lever means when the safety bar means is moved in the first direction, and to cause the second ear member to engage the second portion and rock the latch member to release the lever means when the safety bar means is moved in the second direction; and
- means for biasing the lever means to shift the link member towards the first position and loosen the belt when the lever means is released.

14. The invention defined in claim 13 further characterized by a housing for the release mechanism mounted on the implement and having an opening through which the rod means extends and in which the safety bar means is external of the housing.

* * * * *